United States Patent
Lu et al.

(10) Patent No.: US 12,222,456 B2
(45) Date of Patent: Feb. 11, 2025

(54) DYNAMIC RECEIVER GAIN CONTROL FOR LIDAR SYSTEM

(71) Applicant: GUANGZHOU WOYA LAIDELING TECHNOLOGY CO., LTD., Gaungzhou (CN)

(72) Inventors: Yue Lu, Mountain View, CA (US); Vipul Chawla, Mountain View, CA (US); Youmin Wang, Mountain View, CA (US)

(73) Assignee: GUANGZHOU WOYA LAIDELING TECHNOLOGY CO., LTD., Guangzhou (CN)

( * ) Notice: Subject to any disclaimer, the term of this patent is extended or adjusted under 35 U.S.C. 154(b) by 847 days.

(21) Appl. No.: 16/995,423

(22) Filed: Aug. 17, 2020

(65) Prior Publication Data

US 2022/0003851 A1 Jan. 6, 2022

Related U.S. Application Data

(63) Continuation-in-part of application No. 16/920,650, filed on Jul. 3, 2020, now abandoned.

(51) Int. Cl.
*G01S 7/486* (2020.01)
*G01S 7/481* (2006.01)
*G01S 17/931* (2020.01)

(52) U.S. Cl.
CPC .......... *G01S 7/4868* (2013.01); *G01S 7/4817* (2013.01); *G01S 17/931* (2020.01)

(58) Field of Classification Search
CPC .... G01S 7/4868; G01S 7/4817; G01S 17/931; G01S 17/42; G01S 17/89
See application file for complete search history.

(56) References Cited

U.S. PATENT DOCUMENTS

| | | | |
|---|---|---|---|
| 2001/0002860 A1 | 6/2001 | Ohishi et al. | |
| 2007/0131844 A1 | 6/2007 | Shoji et al. | |
| 2009/0322616 A1* | 12/2009 | Bandhauer | G01S 13/50 |
| | | | 342/419 |

(Continued)

FOREIGN PATENT DOCUMENTS

KR 10-2019-0117418 A 10/2019

OTHER PUBLICATIONS

International Search Report issued in corresponding International Application No. PCT/CN2021/042441, mailed Nov. 10, 2021, 4 pages.

(Continued)

*Primary Examiner* — Isam A Alsomiri
*Assistant Examiner* — Sanjida Naser
(74) *Attorney, Agent, or Firm* — BAYES PLLC

(57) ABSTRACT

Embodiments of the disclosure provide an optical sensing system, a method for controlling a receiver gain in the optical sensing system, and a receiver in the optical sensing system. The exemplary optical sensing system includes a transmitter configured to emit light beams at a plurality of vertical detection angles to scan an object. The optical sensing system further includes a receiver having a detector configured to detect the light beams returned by the object. The optical sensing system also includes a controller configured to dynamically vary a gain of the detector for detecting the light beams of the respective vertical detection angles.

18 Claims, 7 Drawing Sheets

(56) References Cited

U.S. PATENT DOCUMENTS

| | | | |
|---|---|---|---|
| 2016/0154092 A1 | 6/2016 | Pavao-Moreira et al. | |
| 2018/0113200 A1* | 4/2018 | Steinberg | G01S 7/4863 |
| 2018/0284229 A1* | 10/2018 | Liu | H03G 3/3084 |
| 2019/0271767 A1* | 9/2019 | Keilaf | G01S 7/4815 |
| 2020/0103500 A1* | 4/2020 | Shand | G01S 7/4817 |
| 2020/0341146 A1* | 10/2020 | Dussan | G01S 17/10 |

OTHER PUBLICATIONS

Written Opinion of the International Searching Authority issued in corresponding International Application No. PCT/US2021/042441, mailed Nov. 10, 2021, 4 pages.

* cited by examiner

DYNAMIC RECEIVER GAIN CONTROL FOR LIDAR SYSTEM

CROSS-REFERENCE OF RELATED APPLICATIONS

This application is a continuation-in-part of U.S. application Ser. No. 16/920,650, titled "Dynamic Laser Power Control for LiDAR System," filed Jul. 3, 2020, the content of which is incorporated by reference.

TECHNICAL FIELD

The present disclosure relates to gain control for a light detection and ranging (LiDAR) system, and more particularly to, dynamically controlling the receiver gain to compensate for the change of detection distance at different vertical detection angles of the LiDAR system.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The pulsed laser light beams emitted by a LiDAR system are typically directed to multiple directions to cover a field of view (FOV). For example, the vertical detection angle (known as the look-down angle when the scanning laser beam points downward) of the LiDAR system varies to scan objects in a vertical space. The required detection distance varies with the vertical detection angle. For instance, when the look-down angle is small, i.e., LiDAR emits scanning laser beam nearly horizontally, the distance toward an object is longer. On the other hand, with an increasing looking-down angle, the distance toward the ground is shorter.

Laser beams reflected by objects at shorter distance (e.g., near the ground) may carry higher power. However, conventional LiDAR systems use a constant receiver gain for different vertical detection angles. As a result, laser beams reflected from shorter distances may result in saturation on the receiver. Receiver saturation can impair the accuracy of its measurement of the distance and intensity and cause other problems such as overheating and instability of the receiver.

Embodiments of the disclosure improve the performance of optical sensing systems such as LiDAR systems by implementing a dynamic receiver gain control to compensate for the change of detection distance at different vertical detection angles of the sensing system.

SUMMARY

Embodiments of the disclosure provide an optical sensing system. The exemplary optical sensing system includes a transmitter configured to emit light beams at a plurality of vertical detection angles to scan an object. The optical sensing system further includes a receiver having a detector configured to detect the light beams returned by the object. The optical sensing system also includes a controller configured to dynamically vary a gain of the detector for detecting the light beams of the respective vertical detection angles.

Embodiments of the disclosure also provide a method for controlling receiver gain in an optical sensing system. The method includes emitting, by a transmitter, light beams at a plurality of vertical detection angles to scan an object. The method further includes detecting, by a detector in a receiver, the light beams returned by the object. The method also includes dynamically varying, by a controller, a gain of the detector for detecting the light beams of the respective vertical detection angles.

Embodiments of the disclosure further provide a receiver in an optical sensing system. The receiver includes a detector configured to detect light beams returned from an object scanned by the light beams emitted at a plurality of vertical detection angles. The receiver further includes a controller configured to dynamically vary a gain of the detector based on a predetermined look-up table mapping the respective vertical detection angles to target detector gains. The target detector gains are proportional to a square of detection distances determined based on an elevation of the optical sensing system positioned above a ground and the respective vertical detection angles.

It is to be understood that both the foregoing general description and the following detailed description are exemplary and explanatory only and are not restrictive of the invention, as claimed.

DETAILED DESCRIPTION

Figure 1:
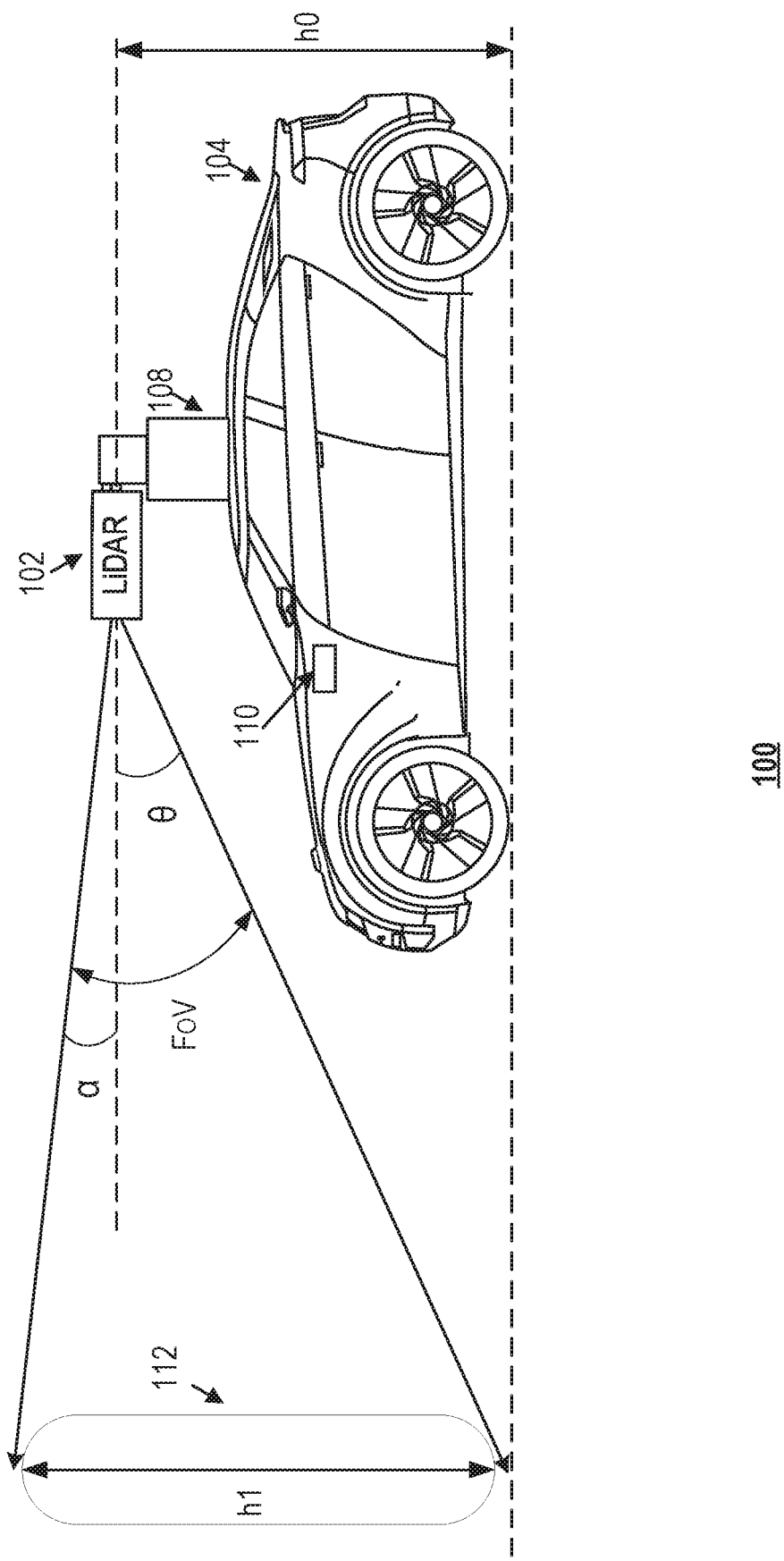
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for dynamically controlling the receiver gain in an optical sensing system (e.g., a LiDAR system). For example, the optical sensing system may include a transmitter configured to emit light beams (e.g., laser beams) at a plurality of vertical detection angles to scan an object. At smaller vertical detection angles, the detection distance is longer while at larger vertical detection angles, the detection distance shortens. The emitted light beams are reflected and returned from the object being scanned, and received by a receiver of the optical sensing system. For example, the receiver may include a detector that detects the returned light beams.

In some embodiments, the optical sensing system includes a controller configured to dynamically vary a gain of the detector for receiving the light beams emitted at the respective vertical detection angles. For example, the detector gain may be adjusted according to the detection distances at the various vertical detection angles, as light beams returned from shorter detection distances carry higher laser power and thus warrant using a lower gain. In some embodiments, the detector gain can be varied proportional to a square of the detection distances. In some further embodiments, the detector gain may be further adjusted by a ratio of the reflectivity of the object and the reflectivity of the ground. As another example, the controller may determine a threshold angle based on an elevation of the optical sensing system positioned above a ground and a threshold detection distance of the optical sensing system. The controller then reduces the detector gain when the vertical detection angle surpasses the threshold angle.

In some embodiments, the detector may further include a photodetector, a signal amplifier, and a signal conditioning circuit, and the gain of the detector can be varied by adjusting the gains of one or more of these individual components. For example, the controller can adjust the bias voltage of the photodetector in order to adjust the amplitude of the electrical signal generated by the photodetector in response to receiving a light beam. As another example, the controller can adjust the gain of the signal amplifier and/or signal conditioning circuit in order to adjust the signal amplitude.

In some embodiments, the detector gain control may be implemented with an open-loop or closed-loop method, or a hybrid version of the two. For example, in an open-loop control, the controller can look up a target gain of the detector for each vertical detection angle at which the light beam is emitted, and adjust the gain of the detector to the target gain. As another example, in a closed-loop control, a saturation detection circuit may be used to detect a saturation condition of the detector. When a saturation occurs, the controller may reduce the gain of the detector in response until the gain is reduced to a level that removes the saturation condition in the detector. In some embodiments, the saturation detection circuit may differentiate which component(s) of the detector causes the saturation and the controller may specifically adjust the again of that component(s) to address the saturation.

By dynamically and adaptively varying the receiver gain, embodiments of the present disclosure therefore improve the performance of an optical sensing system. For example, by avoiding saturation on the receiver end, the detection accuracy of the optical sensing system can be improved. On the other hand, reducing receiving power in the receiver also benefits thermal efficiency of the system. The improved optical sensing system can be used in many applications. For example, the improved optical sensing system can be used in advanced navigation technologies, such as to aid autonomous driving or to generate high-definition maps, in which the optical sensing system can be equipped on a vehicle.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with a pulsed laser beam and measuring the reflected/scattered pulses with a receiver. The laser beam used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

In some embodiments, LiDAR system 102 may be mounted at a certain elevation (e.g., $h_0$ as shown in FIG. 1) above the ground such that it can scan objects at a range of heights using laser beams emitted at different vertical detection angles. For example, FIG. 1 shows a field of view (FOV) consisting of a range of vertical detection angles to cover an object 112 up to hi in height above the ground. A vertical detection angle of a laser beam pointing upward relative to the horizontal direction (e.g., angle $\alpha$ as shown in FIG. 1) may be referred to as a look-up angle, and a vertical detection angle of a laser beam pointing downward relative to the horizontal direction (e.g., angle $\theta$ as shown in FIG. 1) may be referred to as a look-down angle.

In some embodiments, the vertical detection angle of LiDAR system 102 may be adjusted by mounting structure 108 and/or the scanner within LiDAR system 102. In some embodiments, the vertical detection angle may also be impacted by the pose of vehicle 100, e.g., whether vehicle 100 is traveling uphill or downhill. When the look-down angle $\theta$ is larger than a certain value, the laser beam emitted by LiDAR system 102 may impinge on the ground and the corresponding detection distance may be smaller than the maximum detection distance. In such cases, because the laser beam travels for a shorter distance, it is less attenuated and the remaining power in the returned laser beam is higher. Consistent with the present disclosure, LiDAR system 102 is configured to dynamically and adaptively adjust the receiver gain when receiving the laser beams during a scan, in a way to compensate for the shorter detection distances at larger vertical detection angles θ.

Figure 2:
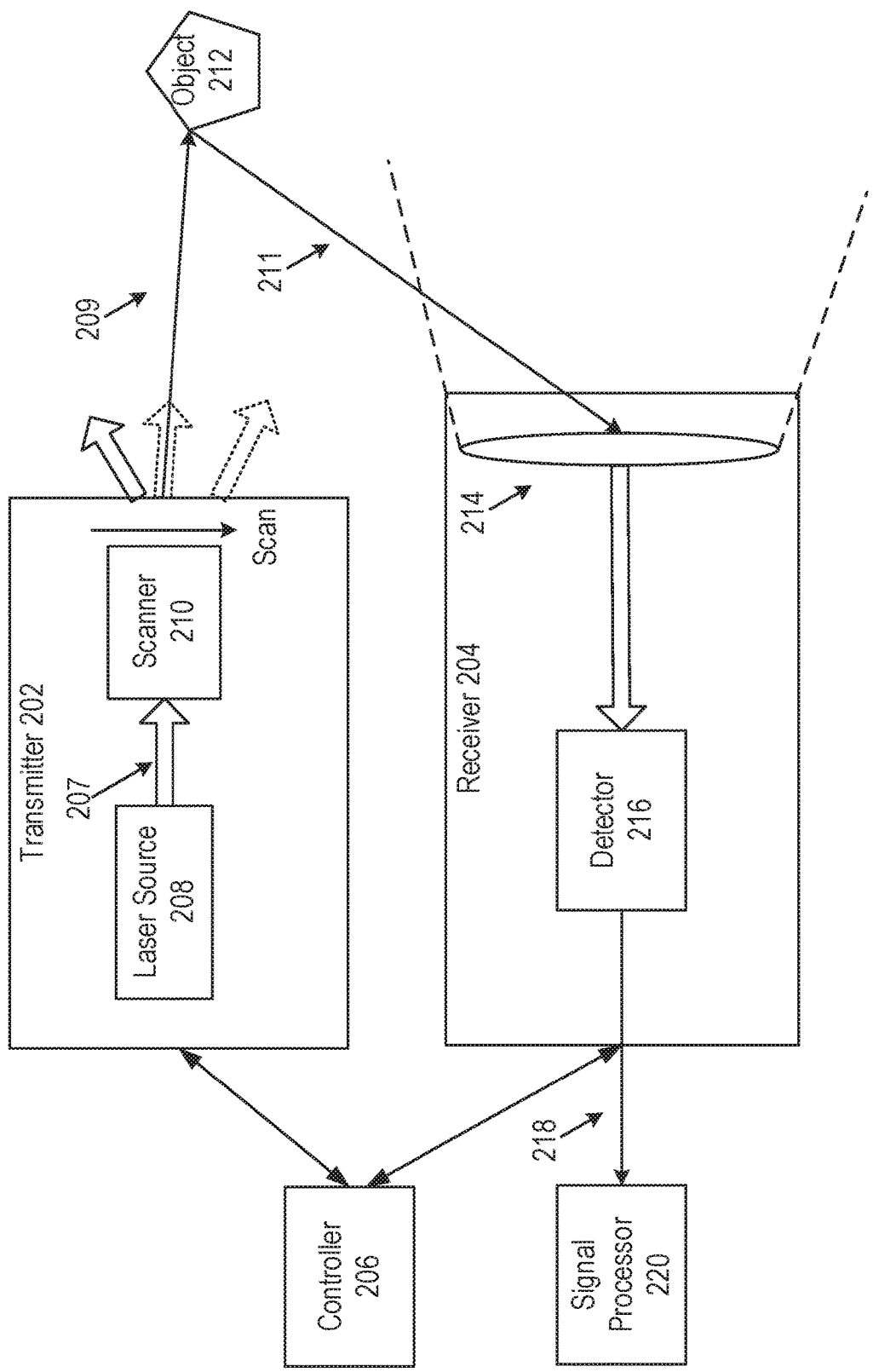
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical beams (e.g., laser beams) along multiple directions. Transmitter 202 may include one or more laser sources 208 and a scanner 210. Transmitter 202 can sequentially emit a stream of pulsed laser beams in different directions within a scan FOV (e.g., a range in angular degrees), as illustrated in FIG. 2.

Laser source 208 may be configured to provide a laser beam 207 (also referred to as "native laser beam") to scanner 210. In some embodiments of the present disclosure, laser source 208 may generate a pulsed laser beam in the ultraviolet, visible, or near infrared wavelength range. In some embodiments of the present disclosure, laser source 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser source may be used as laser source 208 for emitting laser beam 207.

Scanner 210 may be configured to emit a laser beam 209 to an object 212 in a range of vertical detection angles (collectively forming the FOV of transmitter 202 such as shown in FIG. 1). The vertical detection angles can be look-up angles (pointing upward from the horizontal direction) or look-down angles (pointing downward from the horizontal direction). In some embodiments, scanner 210 may also include optical components (e.g., lenses, mirrors) that can collimate pulsed laser light into a narrow laser beam to increase the scan resolution and the range to scan object 212.

In some embodiments, object 212 may be made of a wide range of materials including, for example, non-metallic objects, rocks, rain, chemical compounds, aerosols, clouds and even single molecules. In some embodiments, at each time point during the scan, scanner 210 may emit laser beam 209 to object 212 in a direction within a range of scanning angles by rotating a deflector, such as a micromachined mirror assembly.

In some embodiments, receiver 204 may be configured to detect a returned laser beam 211 returned from object 212. The returned laser beam 211 may be in a different direction from laser beam 209. Receiver 204 can collect laser beams returned from object 212 and output electrical signals reflecting the intensity of the returned laser beams. Upon contact, laser light can be reflected/scattered by object 212 via backscattering, such as Rayleigh scattering, Mie scattering, Raman scattering, and fluorescence. As illustrated in FIG. 2, receiver 204 may include a lens 214 and a detector 216. Lens 214 may be configured to collect light from a respective direction in the receiver field of view (FOV) and converge the light beam to focus on detector 216. At each time point during the scan, returned laser beam 211 may be collected by lens 214. Returned laser beam 211 may be returned from object 212 and have the same wavelength as laser beam 209.

Detector 216 may be configured to detect returned laser beam 211 returned from object 212 and converged by lens 214. In some embodiments, detector 216 may convert the laser light (e.g., returned laser beam 211) converged by lens 214 into an electrical signal 218 (e.g., a current or a voltage signal). Detector 216 may have a gain defined as a ratio between the power of electrical signal 218 and power of the light beam received by detector 216. The higher the gain is, the higher amplitude electrical signal 218 has. Consistent with the present disclosure, the gain of detector 216 can be dynamically varied at different vertical detection angles of the light beams.

Figure 3:
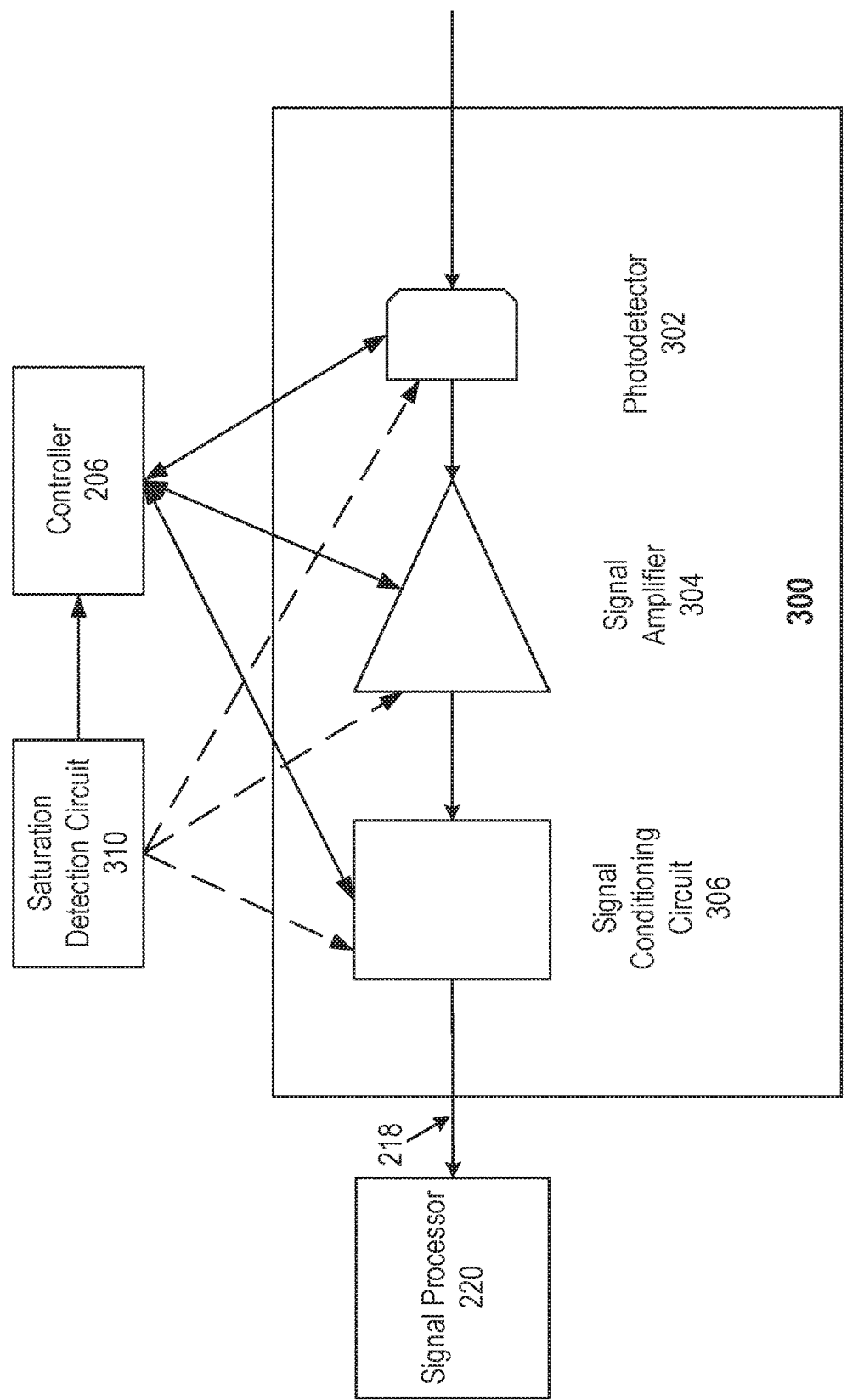
FIG. 3 illustrates a schematic diagram of an exemplary detector in a receiver of a LiDAR system, according to embodiments of the disclosure.

In some embodiments, detector 216 may include several stages and the gain of detector 216 may be adjusted at one or more of the stages. For example, FIG. 3 illustrates a schematic diagram of an exemplary detector 300 in a receiver of a LiDAR system, according to embodiments of the disclosure. As shown in FIG. 3, detector 300 may include three stages: a photodetector 302, a signal amplifier 304, and a signal conditioning circuit 306. Each stage has its own gain defined as a ratio between the output power and input power, and the overall gain of detector 300 is a product of the gains of the individual stages.

Photodetector 302 may include a photodiode that converts light into an electrical current (also known as photocurrent). In some embodiments, photodetector 302 may include a PIN detector, an avalanche photodiode (APD) detector, a single photon avalanche diode (SPAD) detector, a silicon photo multiplier (SiPM) detector, or the like. The photocurrent is generated when photos are absorbed in the photodiode. The ratio of photocurrent generated from incident light to the power of the incident light (known as responsivity of a photodiode) can be manipulated by adjusting the bias voltage of the photodiode. Therefore, the gain of detector 300 can be adjusted by varying the bias voltage of photodetector 302.

Signal amplifier 304 may amplify the electrical signal generated by photodetector 302. In some embodiments, signal amplifier may be a transimpedance amplifier. Signal conditioning circuit 306 may further condition the electrical signal. In some embodiments, signal conditioning circuit 306 may be a limiting amplifier, a log amplifier, a comparator, an analog-to-digital converter (ADC), or a time-to-digital converter (TDC). The gain of detector 300 can be alternatively or additionally adjusted by varying the gains of signal amplifier 304 and/or signal conditioning circuit 306.

In some embodiments, saturation may occur at one or more stages of detector 300. For example, one or more of photodetector 302, signal amplifier 304, and signal conditioning circuit 306 may be saturated. In some embodiments, a saturation detection circuit 310 may be coupled with each of photodetector 302, signal amplifier 304, and signal conditioning circuit 306 to detect the saturation condition. In some embodiments, the gain of the saturated component may be reduced to remove the saturation condition.

Returning to FIG. 2, electrical signal 218 may be transmitted to a data processing unit, e.g., signal processor 220 of LiDAR system 102, to be processed and analyzed. For example, signal processor 220 may determine the distance of object 212 from LiDAR system 102 based on electrical signal 218 and data of laser beam 209. In some embodiments, signal processor may be a field-programmable gate array (FPGA), a microcontroller unit (MCU), a central processing unit (CPU), a digital signal processor (DSP), etc. In some embodiments, signal processor 220 may be part of controller 206.

Controller 206 may be configured to control transmitter 202 and/or receiver 204 to perform detection/sensing operations. In some embodiments consistent with the present disclosure, controller 206 may dynamically determine an appropriate gain for detector 216 based on the vertical detection angle of LiDAR system 102 and adjust the gain to the appropriate level. For example, controller 206 may use a predetermined look-up table (LUT) to determine the target gains for detector 216 corresponding to the various vertical detection angles. In some embodiments, the target gain can be proportional to a square of the detection distances calculated for the respective vertical detection angles. In some further embodiments, the target gain is also proportional to a ratio of the reflectivity of object 212 and the reflectivity of the ground. For example, controller 206 may determine the reflectivity of object 212 based on the returned laser beams received by receiver 204. In another example, controller 206 may determine a threshold angle based on an elevation of LiDAR system 102 positioned above the ground and a threshold detection distance of LiDAR system 102. Controller 206 may reduce the gain when the vertical detection angle surpasses the threshold angle. In yet another example, controller 206 may reduce the gain when saturation detection circuit 310 detects a saturation condition from detector 216.

In some embodiments, controller 206 may generate and send a command signal to detector 216 to adjust its gain. For example, controller 206 may send the command signal to photodetector 302 to adjust its bias voltage, thus adjusting the photocurrent it generates. As another example, controller 206 may send the command signal to signal amplifier 304 and/or signal conditioning circuit 306 to adjust the respective gains.

Figure 4:
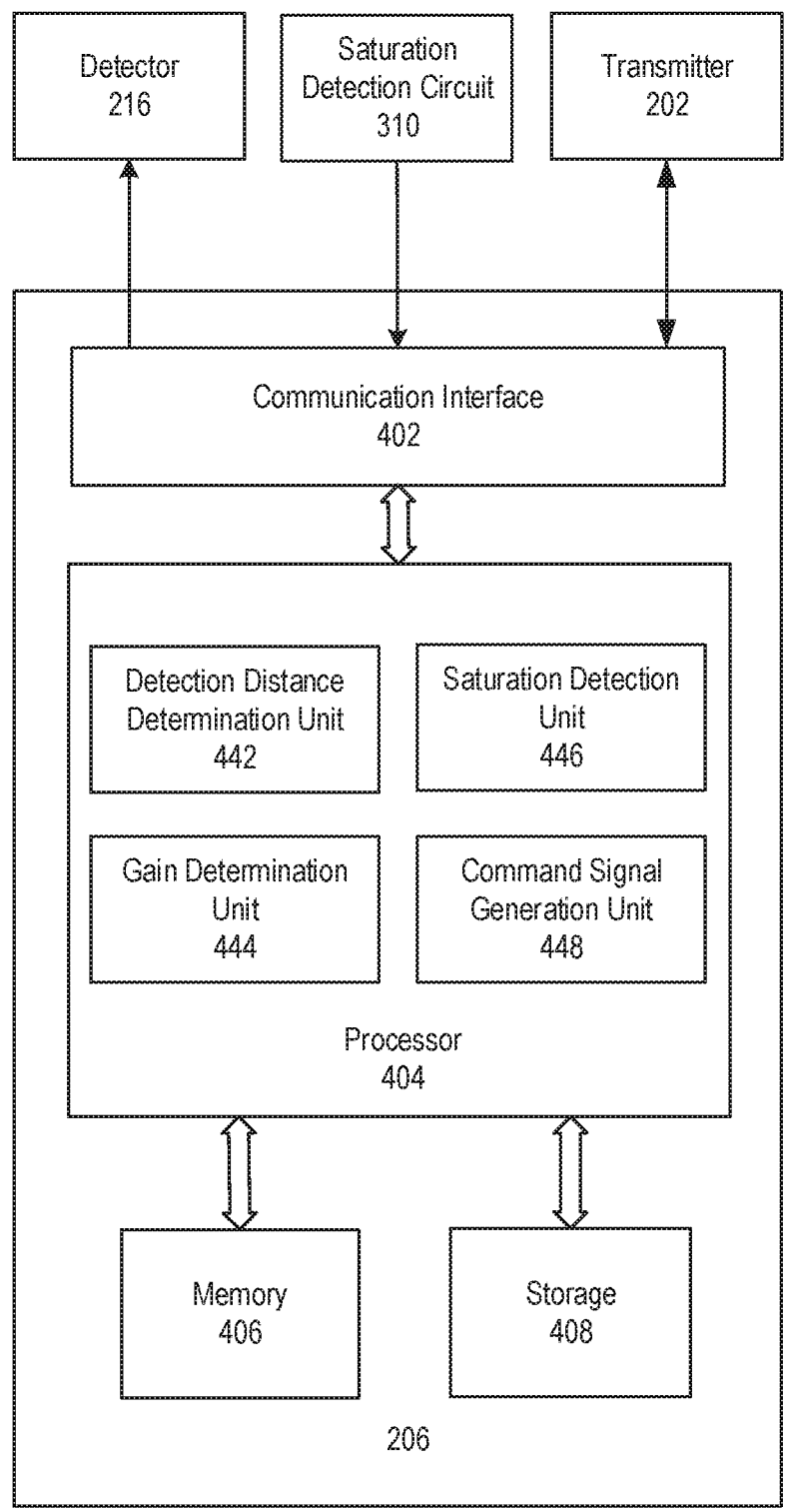
FIG. 4 illustrates a schematic diagram of an exemplary controller for adjusting a receiver gain of a LiDAR system, according to embodiments of the disclosure.

For example, FIG. 4 illustrates a schematic diagram of an exemplary controller 206 for adjusting laser power of a LiDAR system, according to embodiments of the disclosure. As shown by FIG. 4, controller 206 may include a communication interface 402, a processor 404, a memory 406, and a storage 408. In some embodiments, controller 206 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of controller 206 may be located in a cloud or may be alternatively in a single location (such as inside a mobile device) or distributed locations. Components of controller 206 may be in an integrated device or distributed at different locations but communicate with each other through a network (not shown). Consistent with the present disclosure, controller 206 may be configured to dynamically control the gain of detector 216 based on the different vertical detection angles of the emitted laser beams. In some embodiments, controller 206 may also perform various other control functions of other components of LiDAR system 102.

Communication interface 402 may send signals to and receive signals from components of transmitter 202 and receiver 204 (such as detector 216 and components therein) via wired communication methods, such as Serializer/Deserializer (SerDes), Low-voltage differential signaling (LVDS), Serial Peripheral Interface (SPI), etc. In some embodiments, communication interface 402 may optionally use wireless communication methods, such as a Wireless Local Area Network (WLAN), a Wide Area Network (WAN), wireless networks such as radio waves, a cellular network, and/or a local or short-range wireless network (e.g., Bluetooth™), etc. Communication interface 402 can send and receive electrical, electromagnetic or optical signals in analog form or in digital form.

Consistent with some embodiments, communication interface 402 may receive scanning parameters, such as vertical detection angles of emitted laser beams, from transmitter 202. Communication interface 402 may additionally receive detection results from saturation detection circuit 310. Communication interface 402 may provide command signals to detector 216 to dynamically adjust its gain. Communication interface 402 may also receive acquired signals from and provide control signals to various other components of LiDAR system 102.

Processor 404 may include any appropriate type of general-purpose or special-purpose microprocessor, digital signal processor, or microcontroller. Processor 404 may be configured as a separate processor module dedicated to LiDAR emitting power control, e.g., dynamically determining a target gain for detector 216 for receiving light beams of different vertical detection angles and generating command signals to adjust the gain of detector 216 to that target gain. Alternatively, processor 404 may be configured as a shared processor module for performing other functions of LiDAR controls.

Memory 406 and storage 408 may include any appropriate type of mass storage provided to store any type of information that processor 404 may need to operate. Memory 406 and storage 408 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 406 and/or storage 408 may be configured to store one or more computer programs that may be executed by processor 404 to perform functions disclosed herein. For example, memory 406 and/or storage 408 may be configured to store program(s) that may be executed by processor 404 for dynamic receiver gain control in a LiDAR. In some embodiments, memory 406 and/or storage 408 may further store a predetermined look-up table that maps various vertical detection angles to corresponding pre-calculated target gains. In some embodiments, memory 406 and/or storage 408 may also store intermediate data such as threshold vertical detection angle, detection distances corresponding to the different vertical detection angles, reflectivity of the object being scanned, desired gains for the respective vertical detection angles, etc.

As shown in FIG. 4, processor 404 may include multiple modules, such as a detection distance determination unit 442, a gain determination unit 444, a saturation detection unit 446, and a command signal generation unit 448, and the like. These modules can be hardware units (e.g., portions of an integrated circuit) of processor 404 designed for use with other components or software units implemented by processor 404 through executing at least part of a program. The program may be stored on a computer-readable medium, and when executed by processor 404, it may perform one or more functions. Although FIG. 4 shows units 442-448 all within one processor 404, it is contemplated that these units may be distributed among different processors located closely or remotely with each other.

Figure 5:
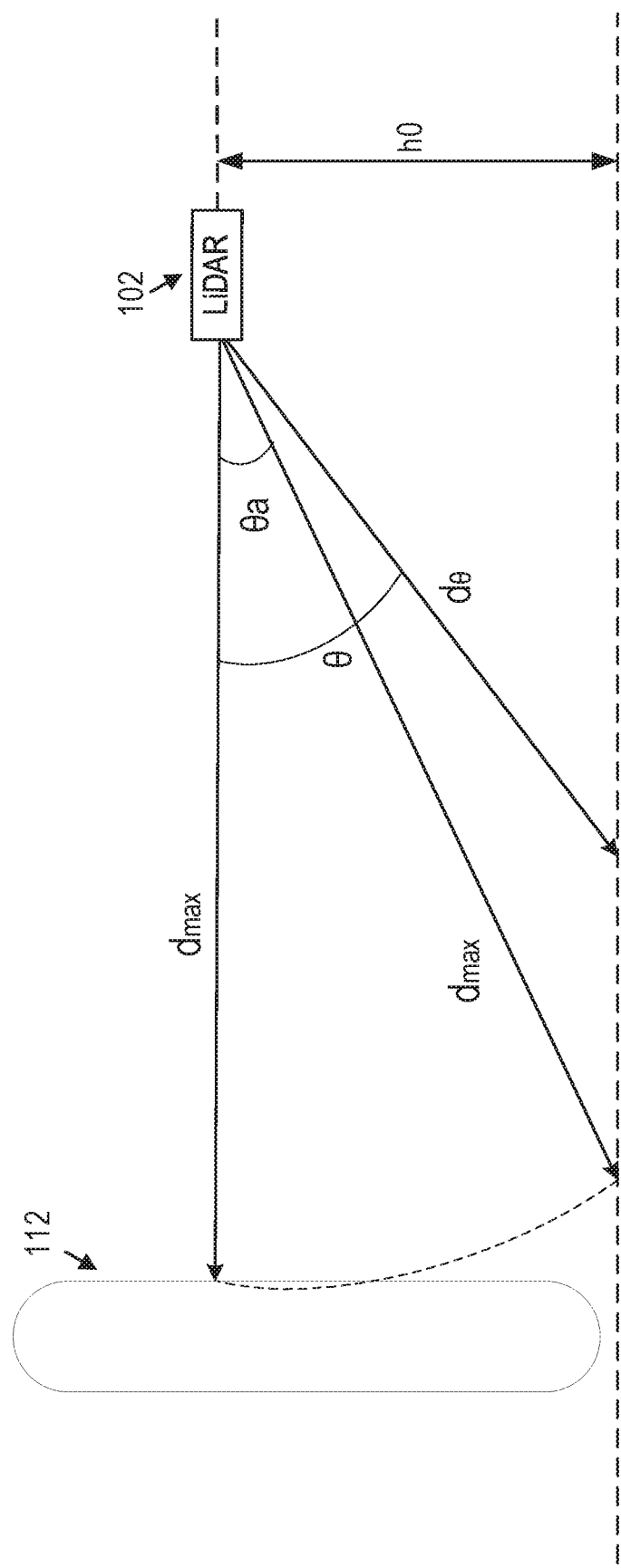
FIG. 5 illustrates vertical detection angles used during a LiDAR scan and corresponding detection distances, according to embodiments of the disclosure.

In some embodiments, detection distance determination unit 442 may calculate the detection distances corresponding to various vertical detection angles within the transmitter FOV. For example, FIG. 5 illustrates vertical detection angles used during a LiDAR scan and corresponding detection distances, according to embodiments of the disclosure. As shown in FIG. 5, LiDAR system 102 may locate at an elevation of $h_0$ above the ground plane. For example, LiDAR system 102 may be mounted on vehicle 100 and therefore lifted above the ground. LiDAR system 102 may have maximum detection distance $d_{max}$ (also referred to as a threshold detection distance), which corresponds to the horizontal distance between object 112 and LiDAR system 102.

In some embodiments, the detection distance may be calculated as a function of the vertical detection angle (e.g., look-down angle θ as shown in FIG. 5). For example, the vertical detection angles may be determined based on the vertical scanning angles of scanner 210, the tilt angle of LiDAR system 102 (e.g., by mounting structure 108), and the elevation angle if the vehicle on which LiDAR system 102 is mount is traveling on a slope (e.g., uphill or downhill). In some embodiments, the vertical scanning angles of scanner 210 may be stored in controller 206 or obtained from another controller that controls the scanning of laser beams. The tilt angle and/or the elevation angle, if non-zero, are subtracted from the vertical scanning angles to obtain the vertical detection angles. For example, if the vertical scanning angle is 40°, LiDAR system 102 is mounted to be tilted upward for 10°, and vehicle 100 is traveling downhill on a slope of 15° (i.e., a −15° elevation angle), the vertical detection angle is determined as 40°−10°−(−) 15°=45°.

In some embodiments, the detection distances may be calculated differently for vertical detection angles in two ranges: a first range of [0, $θ_a$], where $θ_a$ is a threshold angle, and a second range of [$θ_a$, 90°). In some embodiments, the threshold angle $θ_a$ may be determined according to Equation (1):

$$θ_a = \sin^{-1}\left(\frac{h0}{d_{max}}\right) \quad (1)$$

where $h_0$ is the elevation of LiDAR system 102 above the ground plane, and $d_{max}$ is the maximum detection distance.

When the vertical detection angle (e.g., look-down angle θ as shown in FIG. 5) is smaller than $θ_a$ (i.e., in the first range), the detection distance remains $d_{max}$. When the look-down angle θ is larger than $θ_a$ (i.e., in the second range), the detection distance do becomes smaller. In some embodiments, the detection distance can be determined using Equation (2):

$$d_θ = \frac{h0}{\sin θ}. \quad (2)$$

Based on the determined detection distances, gain determination unit 444 may calculate the target gain for detector 216. In some embodiments, for detection distances $d_θ$ shorter than the maximum detection distance $d_{max}$ (i.e., for vertical detection angles θ larger than the threshold angle $θ_a$), gain determination unit 444 may reduce the detector gain from the maximum gain $G_{max}$ to a smaller but sufficient level. In some embodiments, the target gain may be proportional to a square of the respective detection distances. In some further embodiments, the target gain is proportional to a ratio of a first reflectivity of the target object and a second reflectivity of the ground. For example, gain determination unit 444 may calculate the target gain (Go) at look-down angle θ according to Equation (3):

$$G_θ = \left(\frac{d_θ}{d_{max}}\right)^2 \cdot \frac{ρ_{object}}{ρ_{ground}} \cdot G_{max} \quad (3)$$

where $G_{max}$ is the maximum gain of detector 216, $ρ_{object}$ is the reflectivity of target object and $ρ_{ground}$ is the reflectivity of ground plane, $d_θ$ is the detection distance at look-down angle θ, and $d_{max}$ is the maximum detection distance. In some embodiments, the reflectivity of ground plane may be predetermined and preprogramed into controller 206. In some embodiments, the reflectivity of the target object (e.g., object 112) may be determined dynamically based on returned laser beam signals received by receiver 204 in real-time.

In some embodiments, the target gains $G_{θ_s}$ corresponding to various vertical detection angles $θ_S$ of the light beams may be calculated offline, e.g., by a separate processor, according to Equations (1)-(3). The mapping between the target gains and the vertical detection angles may be recorded in a look-up table and preprogramed in controller 206. For example, the look-up table may be stored in memory 406 or storage 408 of controller 206. According to such embodiments, the calculations performed by detection distance determination unit 442 described above may be skipped. Gain determination unit 444 may determine the target gain by looking up the vertical detection angles θ in the look-up table.

In some embodiments, saturation detection unit 446 may determine whether a saturation condition has occurred based on the detection results provided by saturation detection circuit 310. In some embodiments, if a saturation condition is detected, saturation detection unit 446 may additionally determine where the saturation condition has occurred, e.g., in photodetector 302, signal amplifier 304 and/or signal conditioning circuit 306.

Command signal generation unit 448 may generate a command signal to adjust the gain of detector 216 according to the determination by gain determination unit 444 and/or saturation detection unit 446. In some embodiments, when open-loop control is used, the command signal may be generated based on the target gain determined by gain determination unit 444 in order to adjust the gain of detector 216 to the target gain. The open-loop control method will be described in more details in connection with FIG. 6. In some alternative embodiments, when closed-loop control used, the command signal may be generated to reduce the gain of detector 216 when a saturation condition is detected, until the gain is reduced to a level that the saturation condition no longer exists. The closed-loop control method will be described in more details in connection with FIG. 7. In yet some alternative embodiments, a hybrid control method can be used. For example, gain determination unit 444 may first generate an initial command signal to adjust the gain of detector 216 to the target gain determined by gain determination unit 444, and then generate another command signal to fine tune the gain until saturation condition disappears from detector 216.

In some embodiments, the command signal may adjust the gains of one or more stages in detector 216. For example, it may adjust the bias voltage of photodetector 302, and/or the gains of signal amplifier 304 and/or signal conditioning circuit 306. In some embodiments, based on where the saturation condition occurs, as determined by saturation detection unit 446, the command signal may be provided to the respective component to adjust its gain in order to remove the saturation condition.

Figure 6:
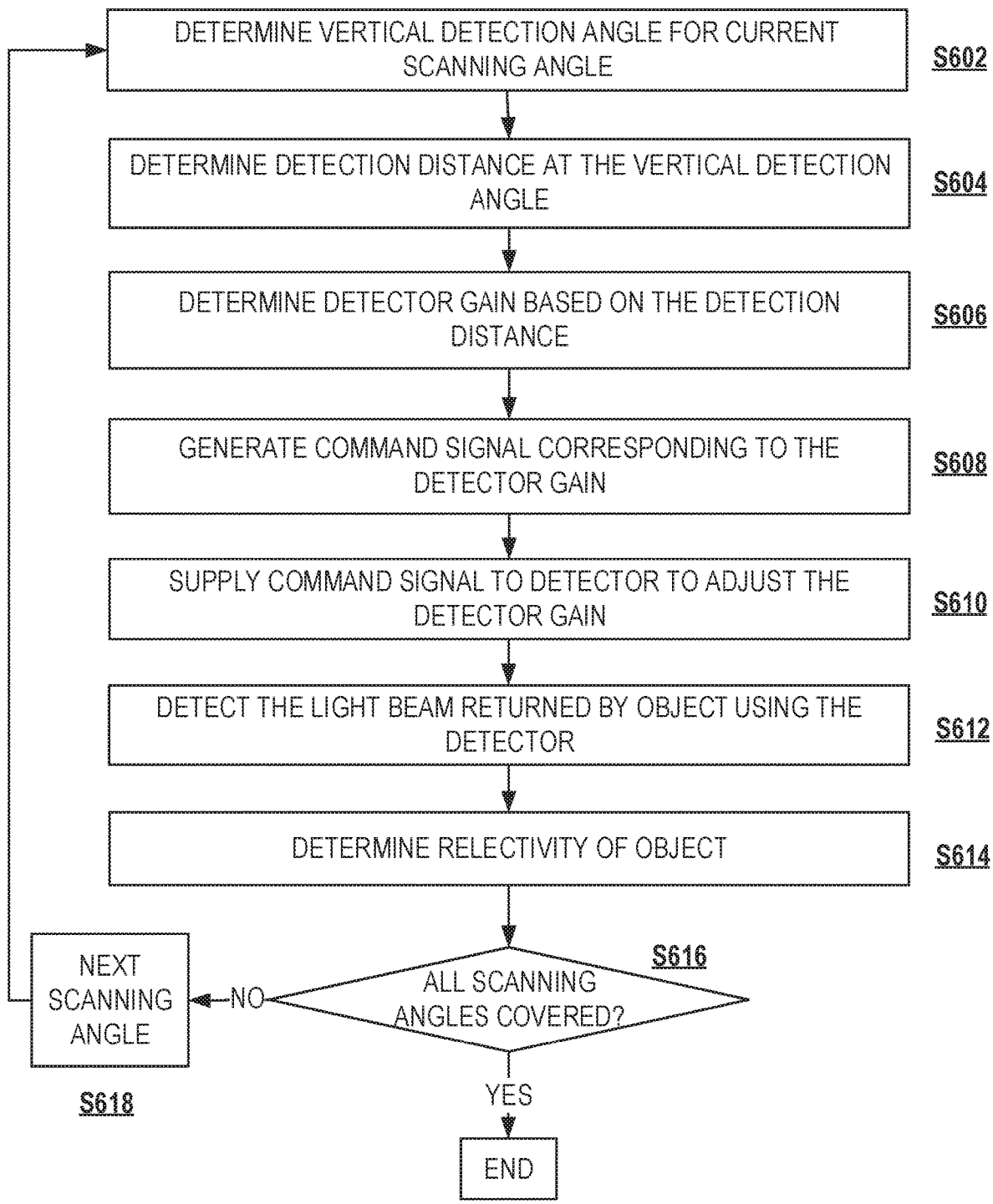
FIG. 6 is a flow chart of an exemplary open-loop control method for adjusting a receiver gain of a LiDAR system, according to embodiments of the disclosure.

FIG. 6 is a flow chart of an exemplary open-loop control method 600 for adjusting a receiver gain of a LiDAR system, according to embodiments of the disclosure. In some embodiments, method 600 may be performed by various components of LiDAR system 102, e.g., receiver 204 and controller 206. In some embodiments, method 600 may include steps S602-618. It is to be appreciated that some of the steps may be optional. Further, some of the steps may be performed simultaneously, or in a different order than shown in FIG. 6.

In step S602, controller 206 may determine the vertical detection angle for the current scanning angle. In some embodiments, controller 206 may receive the current scanning angle used by transmitter 202. In some embodiments, controller 206 may be the same controller that determines the scanning parameters and therefore have the parameters saved in its memory/storage. Therefore, controller 206 may retrieve the scanning angle from its own memory/storage. Otherwise, controller 206 may receive it from an external source. In some embodiments, detection distance determination unit 442 may first determine the current vertical detection angle based on the scanning angle, as adjusted by the tilt angle of LiDAR system 102, and the elevation angle if the vehicle is traveling on a slope.

In step S604, controller 206 may then calculate the detection distance corresponding to the current vertical detection angle. For example, when the vertical detection angle $\theta$ is smaller than a threshold angle $\theta_a$ calculated, e.g., according to Equation (1), detection distance determination unit 342 may determine the detection distance remains the maximum detection distance $d_{max}$. When the angle $\theta$ surpasses than $\theta_a$, detection distance determination unit 342 may determine the detection distance using the elevation $h_0$ and a trigonometry of the angle $\theta$, e.g., according to Equation (2).

In step S606, controller 206 may determine the detector gain for receiving the light beam emitted at the current scanning angle based on the detection distance determined in step S604. In some embodiments, for detection distances $d_\theta$ shorter than the maximum detection distance $d_{max}$, gain determination unit 444 may reduce the gain from the maximum gain $G_{max}$ to a smaller but sufficient level. In some embodiments, the target gain may be proportional to a square of the respective detection distances. In some further embodiments, the emitting power level is proportional to a ratio of a first reflectivity of the target object and a second reflectivity of the ground. For example, gain determination unit 344 may calculate the target gain according to Equation (3).

In step S608, controller 206 may generate a command signal corresponding to the target gain determined in step S606. In some embodiments, the command signal may be generated to adjust the bias voltage of photodetector 302, and/or the gains of signal amplifier 304 and/or signal conditioning circuit 306. In step S610, controller 206 may supply the command signal to the respective components of detector 216 to adjust the gain to the target gain.

In step S612, receiver 204 may detect the light beam returned by the target object using detector 216. For example, receiver 204 may detect a returned laser beam 211 returned from object 212. Receiver 204 can collect laser beams returned from object 212 and output electrical signals reflecting the intensity of the returned laser beams, as adjusted by the gain. In step S614, controller 206 may determine the reflectivity of the target object based on the intensity of the returned laser beams. The reflectivity of the object may be used in step S606 to determine the target gain. For example, the target gain may be further adjusted by a ratio of the reflectivity of the target object and the reflectivity of the ground.

In step S616, controller 206 may determine whether all scanning angles of scanner 210 have been covered, and if not (S616: NO), method 600 proceeds to step S618 to determine and adjust the detector gain for the next scanning angle, for example, by repeating steps S602-S616. Method 600 concludes after scanner 210 goes through all the scanning angles (S616: YES).

In some embodiments, steps S604-S606 may be performed offline for all the vertical detection angles to determine the corresponding target gains. The results may be recorded in a look-up table and saved with controller 206. In real-time execution, method 600 may skip S604 and S606, and instead, method 600 may include a step where controller 206 looks up the target gain for the current vertical detection angle from the predetermined look-up table. By using a look-up table, computation cost can be significantly reduced.

Figure 7:
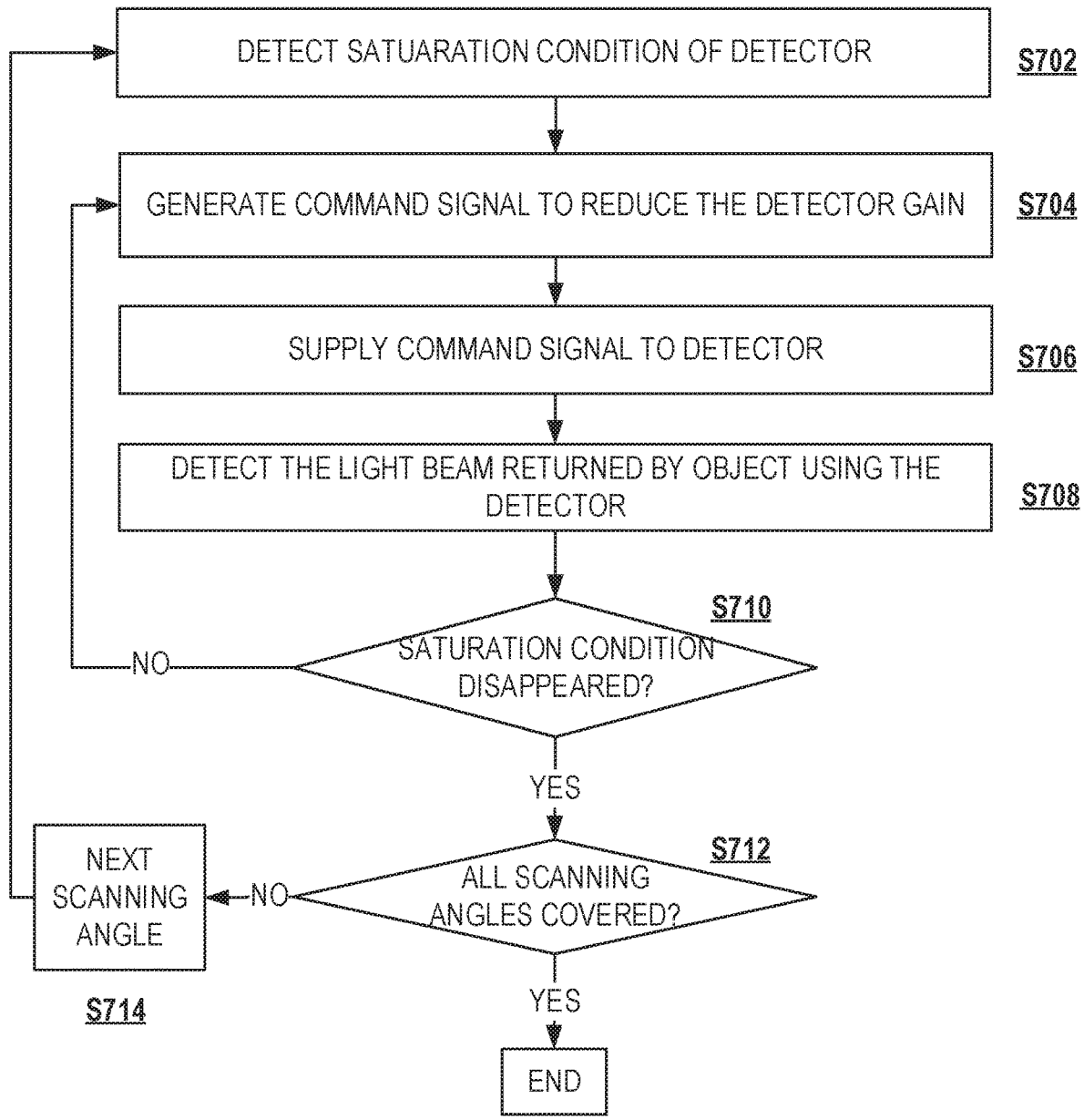
FIG. 7 is a flow chart of an exemplary closed-loop control method for adjusting a receiver gain of a LiDAR system, according to embodiments of the disclosure.

FIG. 7 is a flow chart of an exemplary closed-loop control method 700 for adjusting a receiver gain of a LiDAR system, according to embodiments of the disclosure. In some embodiments, method 700 may be performed by various components of LiDAR system 102, e.g., receiver 204 and controller 206. In some embodiments, method 600 may include steps S702-714. It is to be appreciated that some of the steps may be optional. Further, some of the steps may be performed simultaneously, or in a different order than shown in FIG. 7.

In step S702, controller 206 may detect a saturation condition of detector 216 based on detection results provided by saturation detection circuit 310. In some embodiments, if a saturation condition is detected, controller 206 may additionally determine where the saturation condition has occurred, e.g., in photodetector 302, signal amplifier 304 and/or signal conditioning circuit 306.

In step S704, controller 206 may generate a command signal to reduce the gain of detector 216. In some embodiments, to reduce the overall gain of detector 216, the command signal may be generated to adjust the bias voltage of photodetector 302, and/or the gains of signal amplifier 304 and/or signal conditioning circuit 306. In step S706, controller 206 may supply the command signal to the respective components of detector 216 to adjust the gain to the target gain.

In step S708, receiver 204 may detect the light beam returned by the target object using detector 216. In step S710, controller 206 may determine whether the saturation condition has disappeared. Reducing the gain of detector 216 helps reduce the electrical signal generated by detector 216, thus bringing detector 216 outside the saturation zone. If the saturation condition has not disappeared (S710: NO), method 700 returns to steps S704-S706 to continue generating and supplying the command signal to further reduce the gain. If the saturation condition has disappeared (S710: YES), method 700 may proceed to step S712, where controller 206 determines whether all scanning angles of scanner 210 have been covered. If not (S712: NO), method 700 proceeds to step S714 to adjust the detector gain for the next scanning angle, for example, by repeating steps S702-S712. Method 700 concludes after scanner 210 goes through all the scanning angles (S712: YES).

In some embodiments, a hybrid control method may be implemented by combining certain steps of method 600 and method 700. For example, for each scanning angle, controller 206 may first perform the open-loop control of steps S602-S614 to adjust the gain to a determined target gain. Then controller 206 may perform the closed-loop control of steps S702-S710 to fine tune the gain to ensure no saturation condition still exists.

In some embodiments, the systems and methods described in the current disclosure may be combined with those described in U.S. application Ser. No. 16/920,650, which is incorporated by reference herein. For example, both the emitter power level and the receiver gain may be adjusted to collectively compensate for the change of detection distance at different vertical detection angles of the LiDAR system.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. An optical sensing system comprising:
   a transmitter configured to emit light beams at a plurality of vertical detection angles to scan an object;
   a receiver comprising a detector configured to detect the light beams returned by the object; and
   a controller configured to dynamically vary a gain of the detector for detecting the light beams of the respective vertical detection angles based on a predetermined look-up table mapping the respective vertical detection angles to target detector gains, wherein the controller is further configured to determine a first reflectivity of the object based on the light beams received by the receiver and adjust the gain of the detector by a ratio of the first reflectivity and a second reflectivity of a ground.

2. The optical sensing system of claim 1, wherein to dynamically vary the gain of the detector, the controller is further configured to:
   reduce the gain when the vertical detection angle surpasses a threshold angle, wherein the threshold angle is determined based on an elevation of the optical sensing system positioned above a ground and a threshold detection distance of the optical sensing system.

3. The optical sensing system of claim 1, wherein the target detector gains are proportional to a square of the respective detection distances determined based on an elevation of the optical sensing system positioned above a ground and the respective vertical detection angles.

4. The optical sensing system of claim 1, further comprising a saturation detection circuit configured to detect a saturation condition of the detector, wherein the controller is further configured to fine tune the gain of the detector until the saturation condition disappears.

5. The optical sensing system of claim 1, further comprising a saturation detection circuit coupled to the detector,
   wherein the controller is configured to reduce the gain of the detector when the saturation detection circuit detects a saturation condition of the detector when receiving the light beam of a vertical detection angle.

6. The receiver optical sensing system of claim 5, wherein the detector comprises a photodetector, a signal amplifier, and a signal conditioning circuit,
   wherein the controller is configured to reduce a gain of the photodetector, the signal amplifier, or the signal conditioning circuit from which the saturation detection circuit detects the saturation condition.

7. The optical sensing system of claim 1, wherein the detector comprises a photodetector configured to generate electrical signals in response to receiving the light beams of the respective vertical detection angles,
   wherein to dynamically vary the gain of the detector, the controller is further configured to vary a bias voltage of the photodetector.

8. The optical sensing system of claim 1, wherein the detector comprises a signal amplifier configured to amplify electrical signals generated in response to receiving the light beams of the respective vertical detection angles,
   wherein to dynamically vary the gain of the detector, the controller is further configured to vary a gain of the signal amplifier.

9. The optical sensing system of claim 1, wherein the detector comprises a signal conditioning circuit configured to condition electrical signals generated in response to receiving the light beams of the respective vertical detection angles,
   wherein to dynamically vary the gain of the detector, the controller is further configured to vary a gain of the signal conditioning circuit.

10. The optical sensing system of claim 1, wherein the optical sensing system is a Light Detection and Ranging (LiDAR) system.

11. A method for controlling a receiver gain in an optical sensing system, comprising:
   emitting, by a transmitter, light beams at a plurality of vertical detection angles to scan an object;
   detecting, by a detector in a receiver, the light beams returned by the object;
   dynamically varying, by a controller, a gain of the detector for detecting the light beams of the respective vertical detection angles;
   determining, by the controller, a first reflectivity of the object based on the light beams received by the receiver; and
   adjusting, by the controller, the gain of the detector by the ratio of the first reflectivity and a second reflectivity of a ground.

12. The method of claim 11, further comprising reducing the gain of the detector when the vertical detection angle surpasses a threshold angle, wherein the threshold angle is determined based on an elevation of the optical sensing system positioned above a ground and a threshold detection distance of the optical sensing system.

13. The method of claim 11, wherein the gain of the detector is dynamically varied based on a predetermined look-up table mapping the respective vertical detection angles to target detector gains.

14. The method of claim 13, wherein the target detector gains are proportional to a square of the respective detection distances determined based on an elevation of the optical sensing system positioned above a ground and the respective vertical detection angles.

15. The method of claim 13, wherein dynamically varying the gain of the detector further comprises:
   detecting, by a saturation detection circuit, a saturation condition of the detector; and
   fine tuning, by the controller, the gain of the detector unit until the saturation condition disappears.

16. The method of claim 11, wherein dynamically varying the gain of the detector further comprises:
   reducing the gain of the detector when a saturation detection circuit detects a saturation condition of the detector when receiving the light beam of a vertical detection angle.

17. The method of claim 11, wherein the detector comprises a photodetector configured to generate electrical signals in response to receiving the light beams of the respective vertical detection angles,
   wherein dynamically varying the gain of the detector further comprises varying a bias voltage of the photodetector.

18. A receiver in an optical sensing system, comprising:
   a detector configured to detect light beams returned from an object scanned by the light beams emitted at a plurality of vertical detection angles; and
   a controller configured to dynamically vary a gain of the detector based on a predetermined look-up table mapping the respective vertical detection angles to target detector gains, wherein the target detector gains are proportional to a square of detection distances determined based on an elevation of the optical sensing system positioned above a ground and the respective vertical detection angles, and wherein the controller is further configured to determine a first reflectivity of the object based on the light beams received by the receiver and adjust the gain of the detector by the ratio of the first reflectivity and a second reflectivity of a ground.

* * * * *